US00RE38751E

(19) United States
(12) Reissued Patent
Davis

(10) Patent Number: US RE38,751 E
(45) Date of Reissued Patent: Jul. 5, 2005

(54) FOLDABLE TOW BAR

(76) Inventor: Darrel Buell Davis, 170 Macleay Rd., Sequim, WA (US) 98382-9460

(21) Appl. No.: 08/363,966

(22) Filed: Dec. 23, 1994

Related U.S. Patent Documents

Reissue of:
(64) Patent No.: 4,856,805
Issued: Aug. 15, 1989
Appl. No.: 07/064,658
Filed: Jun. 22, 1987

U.S. Applications:
(63) Continuation of application No. 08/253,626, filed on Jun. 3, 1994, now abandoned, which is a continuation of application No. 08/015,262, filed on Feb. 8, 1993, now abandoned, which is a continuation of application No. 07/885,904, filed on May 18, 1992, now abandoned, which is a continuation of application No. 07/768,478, filed on Sep. 30, 1991, now abandoned, which is a continuation of application No. 07/568,276, filed on Aug. 15, 1990, now abandoned.

(51) Int. Cl.[7] ..... B60D 1/00

(52) U.S. Cl. ..... 280/491.4

(58) Field of Search ..... 280/491.4, 491.1

(56) References Cited

U.S. PATENT DOCUMENTS

| | | | | | |
|---|---|---|---|---|---|
| 2,139,970 | A | | 12/1938 | Moore | 280/491.4 |
| 2,796,183 | A | | 6/1957 | Cline et al. | 280/491.4 |
| 2,995,386 | A | | 8/1961 | Peterson | 280/491.4 |
| 3,000,652 | A | | 9/1961 | Hawkins | 280/480 |
| 3,147,027 | A | * | 9/1964 | Bronleewe | 280/491.4 |
| 3,281,163 | A | * | 10/1966 | Wiebe | 280/491.4 |
| 3,419,285 | A | | 12/1968 | Morehouse et al. | 280/491.4 |
| 3,572,765 | A | | 3/1971 | Tieben | 280/491.4 |
| 4,013,303 | A | | 3/1977 | Milner | 280/491.4 |
| 4,139,212 | A | * | 2/1979 | Beebe | 280/491.4 |
| 4,266,800 | A | | 5/1981 | Hawkins | 280/491.4 |

FOREIGN PATENT DOCUMENTS

| | | | | |
|---|---|---|---|---|
| CA | 1171112 | * | 7/1984 | 280/491.4 |

* cited by examiner

*Primary Examiner*—Kevin Hurley
(74) *Attorney, Agent, or Firm*—Christopher Duffy

(57) ABSTRACT

A car towing apparatus which, in its extended locked position, is a rigid tow bar attached to the front end of a towable vehicle and which subsequently can be folded into a compact structure and stored in a visually and non-obstructing, secured position to facilitate the vehicle being driven legally and safely on the highway.

9 Claims, 4 Drawing Sheets

FOLDABLE TOW BAR

Matter enclosed in heavy brackets [ ] appears in the original patent but forms no part of this reissue specification; matter printed in italics indicates the additions made by reissue.

*The present Application is a Continuation of application Ser. No. 08/253,626 filed Jun. 3, 1994 under the same title, now abandoned, which in turn was a Continuation of application Ser. No. 08/015,262 filed Feb. 8, 1993 under the same title, also abandoned, which in turn was a Continuation of application Ser. No. 07/885,904 filed May 18, 1992 under the same title, also abandoned, which in turn was a Continuation of application Ser. No. 07/768,478 filed Sep. 30, 1991 under the same title, also abandoned, which in turn was a Continuation of application Ser. No. 07/568,276 filed Aug. 15, 1990 under the same title, now abandoned.*

BACKGROUND OF THE INVENTION

1. Field of the Invention

The present invention relates to tow bars mounted on vehicles that may be towed and more particularly to the type that can be folded into a compact package and stored on or adjacent to the front bumper.

2. Description of the Prior Art

The basic tow bar that has previously been available must be raised from a horizontal towing position to a vertical position when the towed vehicle is detached from a towing vehicle and driven or parked. Unfortunately, this partially obstructs the driver's vision, particularly i a compact type vehicle which is predominately towed behind a motor home, van or the like. The alternative to this is the physical removal of the tow bar from the towable vehicle and carried in the car. This procedure is not only inconvenient from the standpoint of security for the detached tow bar, but also from the physical effort necessary to accomplish such removal and replacement.

The number of individuals or families with a desire or need to tow a vehicle behind a recreational vehicle is steadily increasing as a greater proportion of the population is spending more time travelling for vacation and retirement activities. Convenience, safety and easy of operation of such apparatus becomes increasingly important in that an extremely high percentage of travelers on the highways today are senior citizens or retirees. Accordingly, in light of the above it is the object of the present invention to provide a foldable tow bar that need not be supported upright in line with the driver's vision but can be quickly folded and stored on the front end of a vehicle. The embodiment shown herein is of a new tow bar concept that can be modified from a rigid towing position into a compact, stored and secure position on the towable vehicle, with a minimum effort, when it is driven on the road. Since the tow bar remains attached to the towable vehicle at all times, there are no intermittant storage problems. Further, while in the secured position on the vehicle, the tow bar cannot interfere with the driver's vision. An outstanding feature of the telescopic arms and rotating collars is that in an unblocked extended position the apparatus arms can be swung from side to side to line up with and hook onto the towing ball. The towed vehicle can then back up against the stops in the arms at which time the lock pins can be replaced. This feature enables the towed car to hook-up with perfect alignment with the towing ball.

SUMMARY OF THE INVENTION

In carrying out the principles of the present invention in accordance with the preferred embodiments thereof an improved tow bar apparatus is folded and stored on a front end of a vehicular frame.

The tow bar apparatus comprises an elongated L-shaped beam, including an outwardly extending lug mounted on the inside vertical surface and has spaced ends secured on the front extended ends of a vehicular frame. There is a left end and right end mounting plate with openings therethrough, and having a pair of adjoining contoured side edges mounted vertically on the inside surface at the spaced ends of the beam. A finger-like upright extension mounted on the outside face of the right end plate has a hole in the outer end. An elongated cylindrical tube is supported at the opposite ends in the plate openings. There is also a left end and right end spaced collar rotatably mounted at opposite ends on the tube. Upstanding ears are mounted on the left end and right end collars to provide a hinge connection. On the bottom side of the right end collar is a pawl-like projection, or arcuate-like lug for preventing sliding movement of the collar when engaged with a lug mounted on the beam. Further, there is a left side and right side telescopic arm, and both arms have a second square tube slidably enclosed in a first square tube. The front end of the second square tube is connected to an elongated loop wherein stop means extending through the side walls of the first square tube limit travel of the second square tube. The rear ends of the second square tubes are pivotally connected to the hinge connection on the left end and right end collars. A coupler has a conventional towing ball hitch mounted thereon. One side of the coupler is pivotally connected to the outer end of the first square tube on the left side and the other side is fixedly secured to the outer end of the first square tube on the right side. In operating the tow bar apparatus means is provided to fold the arms and coupler including unblocking and locking means for storage on the extended frame. Similarly, there is means for unfolding the apparatus so as to extend the arms and coupler to a horizontal towing position.

DETAILED DESCRIPTION OF THE PREFERRED INVENTION

Figure 1:
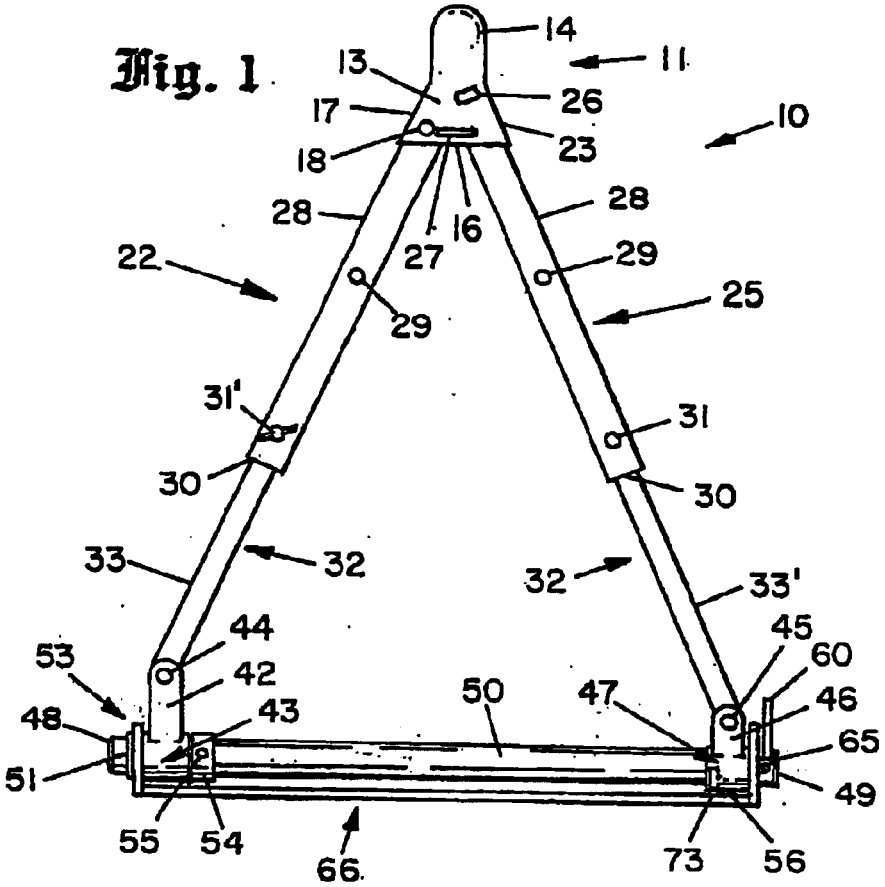
FIG. 1 is a plan view of a preferred embodiment of the present invention shown in towing position with the diverging arms locked in extended alignment.

Referring to FIGS. 1 through 5 it can be seen that the towing bar 10 is a triangular structure comprising a ball coupler 11 pivotally connected to a left side and right side diverging telescopic arms. The outer ends of the arms are likewise pivotally secured to an elongated base assembly. The coupler 11 is adapted to fasten onto a ball connection attached to a towing vehicle. The tow bar can be folded and stored on the front of a vehicle's bumper.

The coupler 11 consists of a pair of spaced Y-shaped plates 12 and 13 connected to a short length of square tubing, not shown, located in the neck portion 14. The tubing provides a solid section on which a conventional towing hitch can be mounted.

Figure 5:
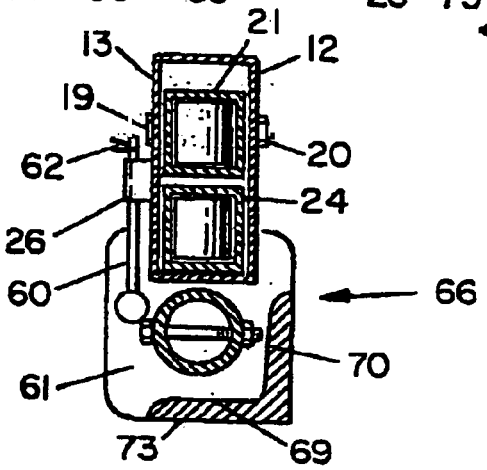
FIG. 5 is a vertical end view of FIG. 4.

At the *relatively flared* rear end 16 of the coupler plate 13 and adjacent to the side edge 17 is a bolt hole 18 extending through both coupler plates. A bolt 19 inserted in the hole and threaded into a nut 20, shown in FIG. 5, are used to connect the coupler 11 pivotally to the front end 21 of a left side telescopic arm 22, *the bolt 19 serving meanwhile as a pivot in the connection at hole 18*. Likewise, adjacent to the opposite side edge 23 the front end 24 of a right side telescopic arm 25 is integrally secured to the coupler 11. Further, a short length of tubing 26 is mounted on plate 13 having an opening extending over the side edge 23. Also on plate 13, a handle 27 is mounted between hole 18 and tube 26 having a hand hold parallel to rear end 16.

Figure 13:
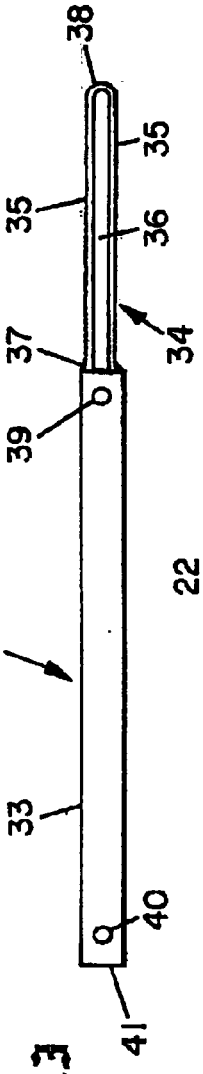
FIG. 13 is a horizontal view of a sliding tube member of a telescopic arm having a slotted end portion.
Figure 14:
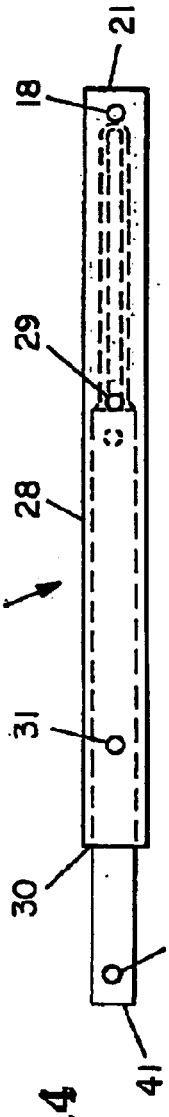
FIG. 14 is a horizontal view of the tube disclosed in FIG. 13 slidably enclosed in another tube of the arm.
Figure 15:
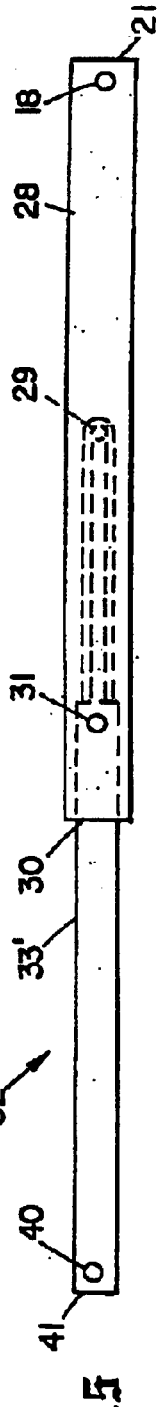
FIG. 15 is a horizontal view of the tubes in FIGS. 13 and 14 in extended position for towing.

The left side arm 22 and right side arm 25 include a similar first square tube 28 which has a stop pin hole 29 extending through the spaced sides of both square tubes 28 approximately intermediate of front and rear ends 21 and 30 respectively, on the first square tube 28 on the left side and similarly between the front end 24 and rear end 30 on the first square tube on the right side of coupler 11. Another hole 31 extending through parallel sides of both square tubes 28 for a lock pin 31', shown in FIG. 1, is located adjacent to rear end 30. A second square tube 32 is slidably enclosed in first square tube 28 of arms 22 and 28. Tube 32, shown in FIGS. 1, 2 and 3 comprises a length of square tubing 33 and 33', respectively to which is attached an elongated loop 34 shown in FIGS. 13 and 15. Loop 34 has two spaced legs 35 forming a slot 36 between the connection of the legs to the front end 37 of tube 33 and 33' and the distal end 38 of loop 34. In the view of FIG. 13, it can be seen that there is a hole 39 adjacent to the front end 37 and another hole 40 adjacent to the rear end 41 of tubes 33 and 33'. In assembling tube 33 and 33' in tube 28 the tube is extended so that slot 36 lays somewhere underneath the stop pin hole 29. A bolt similar to bolt 19 is inserted in hole 29 between the pair of legs 35 and fastened with a nut similar to nut 20 to provide stopping means so as to limit the travel of the tube 33 and 33' to the length of slot 36, shown in FIG. 14. Accordingly, as shown in FIG. 15, when arms 22 and 25 are fully extended tube 33 and 33' are partly withdrawn from tube 28. In this position the hole 39 in tubes 33 and 33' are in alignment with the lock-pin hole 31 in tube 28. A pin 31' inserted in holes 39 and 31 locks tubes 28, 33 and 33' together in a rigid, extended position, reference FIG. 1.

Figure 4:
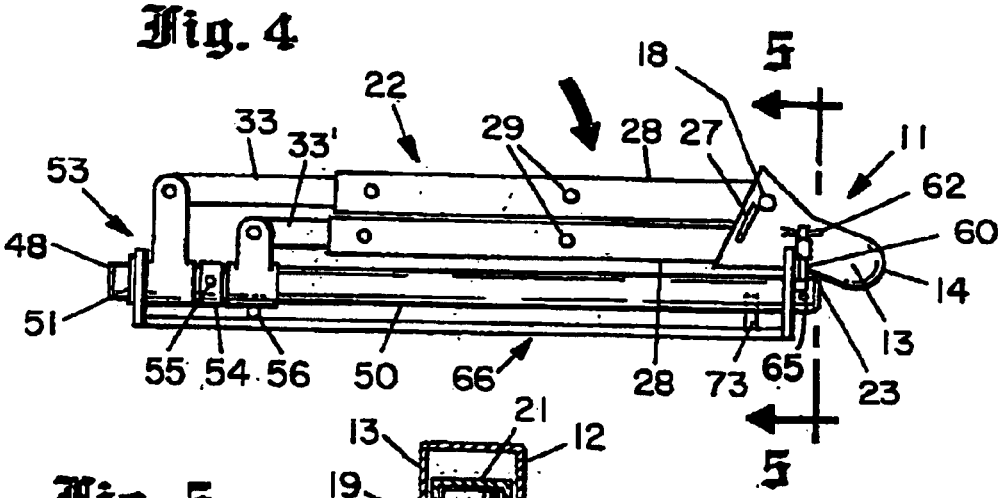
FIG. 4 is a folded view of the apparatus secured on a beam mounted on the front end of a vehicular frame.

The rear end 41 of tube 33 is pivotally connected between a pair of spaced ears 42 mounted on a left end rotatable collar 43. A bolt, similar to bolt 19, extends through holes 44 and 40, and threaded with a nut similar to nut 20 to fasten tube 33 to collar 43. Similarly, tube 33' slidably enclosed in tube 28 of arm 25 has an end 41 pivotally connected between ears 46 mounted on right end rotatable collar 47. The ears 46 have a hole 45 extending therethrough in alignment with hole 40 on square tube 33'. Left and right end collars 43 and 47 are *first and second mounting elements, respectively, for mounting the tow bar on an elongated support member formed by an elongated tube 50, and are* rotatably mounted adjacent to opposite ends 48 and 49 on [an] *the* elongated tube 50. Left end 48 is enclosed with a stop cap 51, and adjacent to the stop cap 51, elongated tube 50 is supported in opening 52 of a left end mounting plate 53. Also, mounted adjafcent to collar 43 on the inward side is a narrow stop ring 54 including a hole 55 extending through the stop ring 54 and elongated tube 50. A typical bolt inserted in hole 55 and fastened with a nut is used to contain collar 43 in rotatable position between the ring 54 and cap 51. Likewide collar 47 is rotatably and slidably mounted on the opposite end 49 of tube 50. An arcuate lug or pawl 56 is secured on the bottom side of collar 47 opposite of ears 46 and extends transversely thereto. Further, tube 50 is supported in the opening 52 of a right end mounting plate 57 which has a square notch portion 58 removed from the top edge 59. A finger-like extension 60 secured on the outside face 61 of the right end mounting plate has a portion extending above edge 59. The outer end of the extension 60 has a hole 64 through which a cotter pin 62, as seen in FIG. 4, can be inserted to fasten left side and right side arms 22 and 25 to extension 60. Another hole 65 extends through tube 50 adjacent to outside face 61, including a conventional nut and bolt that prevents the tube from slipping out of mounting plates 53 and 57.

Figure 6:
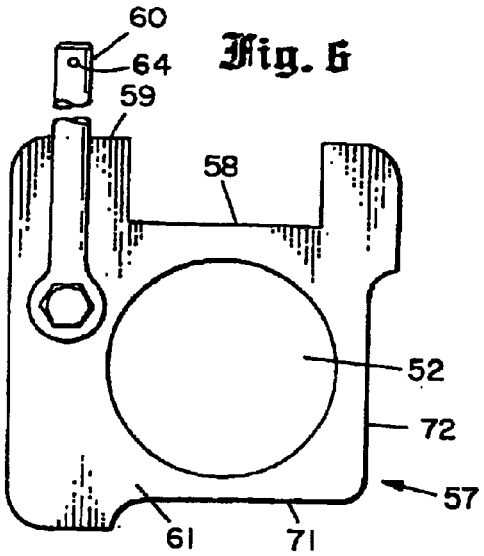
FIG. 6 is a vertical view of a tube supporting plate on which a finger-like extension is attached.
Figure 7:
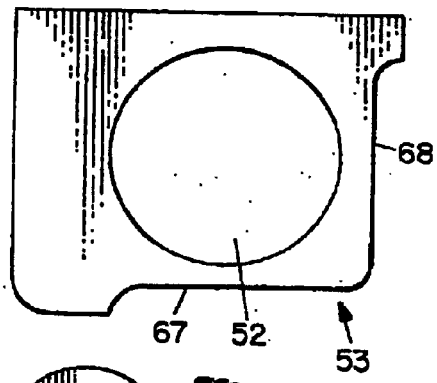
FIG. 7 is a vertical view of a similar plate.
Figure 8:
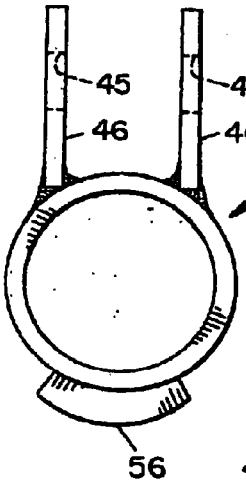
FIG. 8 is a vertical end view of a hinge collar showing spaced ears and a pawl-like lug attached thereon.
Figure 9:
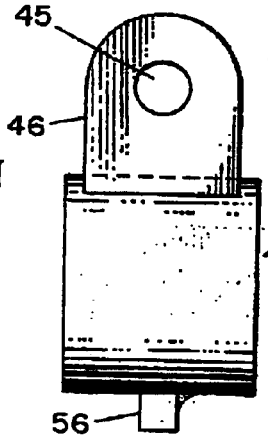
FIG. 9 is a vertical side view of FIG. 8.
Figure 10:
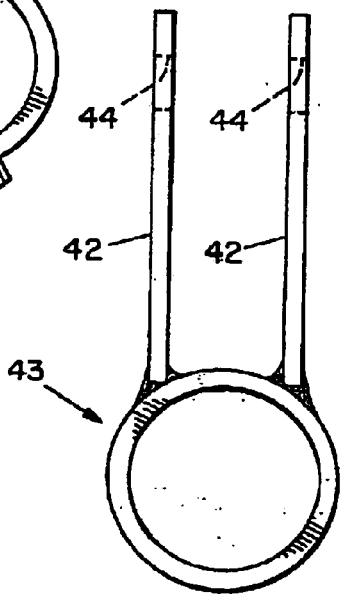
FIG. 10 is a vertical end view of a coupling similar to FIG. 8.
Figure 11:
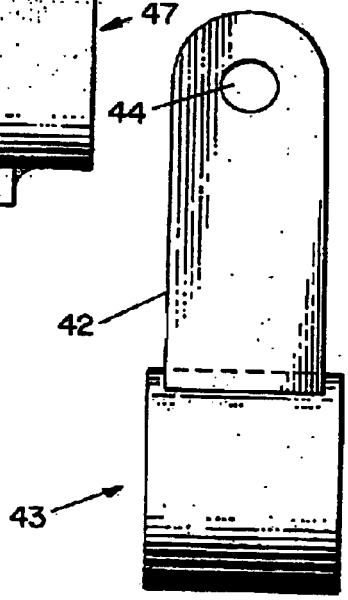
FIG. 11 is a vertical side view of FIG. 10.
Figure 12B:
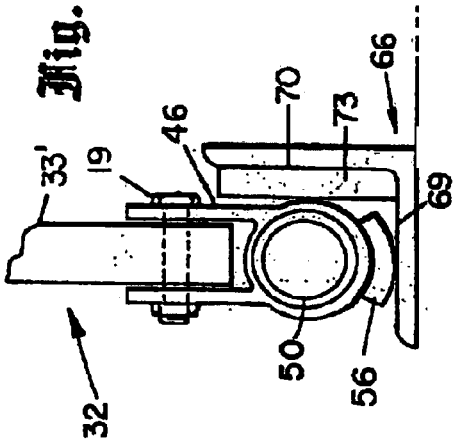
FIG. 12B is a vertical view of FIG. A wherein the arm has been raised to unlock the lug on the collar with the lug on the beam.
Figure 12A:
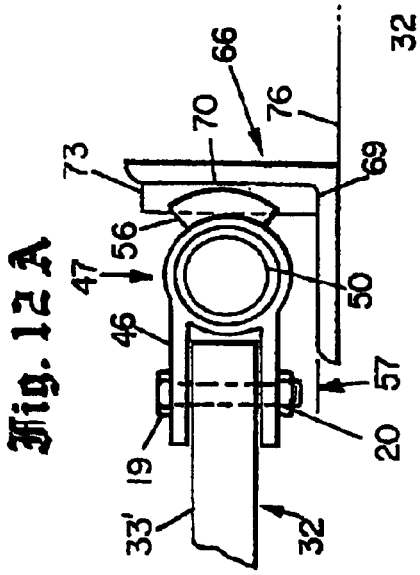
FIG. 12A is a horizontal side view of the pivotal connection of a diverging telescopic arm to the hinge portion of the collar and the pawl-like lug is engaged with the lug on the beam to hold the arm in rigid alignment.

The plates 53 and 57 have two adjoining edges rigidly secured to the spaced ends, not shown, of an L-shaped beam 66 shown in FIGS. 4 and 5. Left end plate 53, seen in FIG. 7, has side edges 67 and 68 contoured to engage the inside horizontal and vertical surfaces 69 and 70, respectively of L-shaped beam 66, shown in FIG. 5. The right end plate 57, shown in FIG. 6, has two side edges 71 and 72 also contoured to conform to the inside surfaces of 69 and 70 of L-shaped beam 66. Connected to the inside vertical surface 70 of beam 66 is a stop lug 73, shown in FIGS. 12A and 12B. Lug 73 is adapted to engage the pawl 56 and secure right end collar 47 in fixed position when tow bar 10 is in horizontal towing position.

Figure 2:
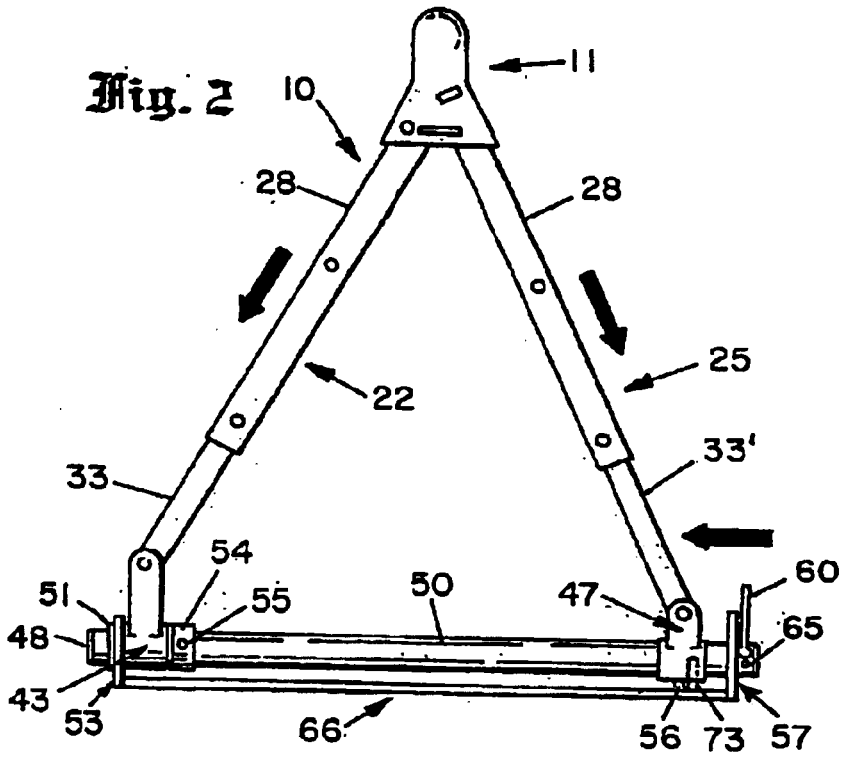
FIG. 2 is a vertical view of the arms depressed and unlocked for folding.
Figure 3:
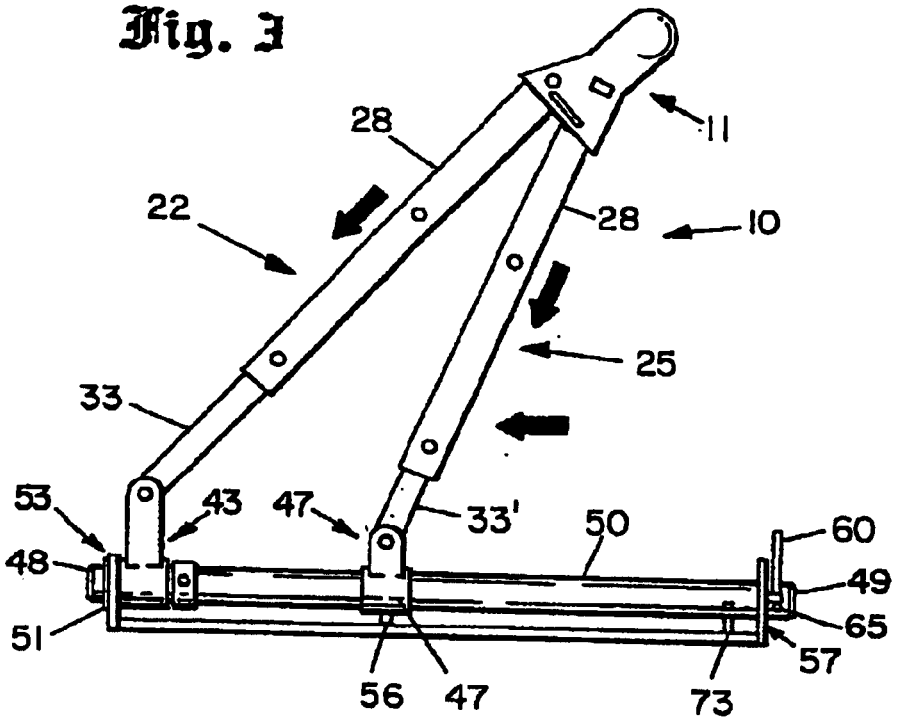
FIG. 3 is a vertical view of the apparatus in the state of folding.

The folding of two bar 10 into a compact package for storing on the front of a bumper is a fast and simple operation. To fold tow bar 10 when unhitched from a towing vehicle the lock pin 31' is withdrawn from lock pin hole 31 located in square tube 33 and 33'. This allows square tubes 33 and 33' to slide freely in tube 28. It needs to be pointed out that when tow bar 10 is in towing position the pawl 56 is locked behind stop lug 73 and right end collar 47 cannot slide on tube 50 thereby holding left and right side arms 22 and 25 in rigid extended alignment. Then holding the handle 27 on coupler 11 the lock pin 31' is pulled from hole 29 on square tube 28 and the tow bar can be swung from a horizontal to a vertical position while the square tubes 33 and 33' are pushed into, tube 28 until the front end 37 of square tubes 33 and 33' abutts against the stop pin 31, a bolt similar to bolt 19. FIG. 2 illustrates the vertical condition whereby tubes 33 and 33' and 28 are compressed together. The pawl 56 has rotated with right end collar 47 so as to disengage with lug 73 on beam 66 and move in front of the lug. Accordingly, collar 47 is now free to slide along tube 50. Referring to FIG. 3, it can be seen that left side and right side arms 22 and 25, respectively, are folding toward end 49 of tube 50 and that collar 47 has moved a considerable distance toward left end collar 43. In FIG. 4, the tow bar is completely folded in a compact structure resting on frame extension 74. The collar 47 has moved along tube 50 to contact ring 54 along side of tube 50. Further as shown in FIGS. 4 and 5, the small tube 26 on coupler 11 has enclosed the upper portion of the finger-like extension 60 whereupon a cotter pin 62 is inserted in hole 64 to lock tow bar in folded position. The tow bar can be quickly unfolded and swung to the horizontal towing position by reversing the procedure cited for folding the tow bar.

I claim:

[1. A tow bar adapted to be folded into a compact structure for storage adjacent to a vehicle front bumper prior to towing, which comprises:

a tow bar apparatus having spaced ends of an L-shaped beam secured to short extensions on the front of a vehicular frame, the beam including inside and outside vertical and horizontal surfaces with a lug extending outwardly from the inside vertical surface adjacent to a right end, A left end mounting plate and a right end mounting plate having outside and inside faces and an opening therethrough, each left and right end plate including a pair of adjoining contoured side edges mounted vertically on the inside surfaces of said beam, and further including an upstanding finger-like extension with a lower end attached to the outside face of the right end plate with a small hole including a cotter pin therein extending through the outer end of the extension, an elongated tube supported at the opposite ends in the left and right end mounting plate opening, a left end collar and a right end collar mounted rotatably on opposite ends of the elongated tube on the inside of said left and right end plates and including a pair of spaced flanges having a hole therethrough for a hinge connection extending from the top, the right end collar also includes an arcuate lug on the bottom portion adapted to engage the lug on said L-shaped beam in a locked connection, a left side telescopic arm and a right side telescopic arm having a rear and front end, the rear end being pivotally connected to the hinge connection on the left and right end collars, and the left and right side arms consisting of a second square tube slidably enclosed in a similar first square tube, and including means for locking each together, a coupler comprising a pair of spaced Y-shaped plates separated by a short length of square tubing and having a conventional towing hitch including a short length of round tubing mounted thereon, the coupler being connected to the front end of said left side telescopic arm and fixedly secured on the other side of the front end of the right side telescopic arm, whereby said left and right side arms in horizontal towing condition being unlocked and raised vertically so as to initiate rotation of said left and right end collars on said elongated tube which rotates said right end collar arcuate lug out of the locked connection with said L-shaped beam lug, and with downward movement the pivotal connection of said left and right side arms with said hinge connection of said left and right end collars urges said right end collar to slide along said elongated tube from right to left and bring said left and right side arms and said round tubing in enclosing contact with a finger-like extension on the outside face of said right end plate, and whereby said coupler being released from said finger-like extension and raised upwardly to allow said right end collar to return to the right end of said elongated tube, and lowered so as to rotate said left and right end collars and engage the locked connection between said arcuate lug on said right end collar and said lug on said L-shaped beam, whereby at horizontal level said left and right side arms may be locked in rigid extension for towing.]

[2. An apparatus as recited in claim 1, wherein:

said beam is an angle having an outside horizontal surface secured to the short extensions.]

[3. An apparatus as recited in claim 1, wherein:

said finger-like extension mounted on the outside face of said right end plate is adapted to close with said short length of round tubing disposed on the coupler and when fastened together with a cotter pin serves to secure the left and right side arms in folded position.]

[4. An apparatus as recited in claim 1 wherein:

the second square tube includes an elongated loop connected to one end of said second square tube for limiting the travel of said second square tube within said first square tube.]

[5. An apparatus as recited in claim 4, wherein:

said first square tube includes a front and rear hole therethrough, and further included is a stop pin and a lock pin, the stop pin being located in said second square tube elongated loop and the lock pin being inserted in the rear hole is adapted to lock the reciprocal movement of said second square tube.]

[6. An apparatus as recited in claim 5, wherein:

said coupler includes on one of the Y-shaped plates a handle for lifting and folding the apparatus.]

[7. An apparatus as recited in claim 1, wherein:

said right end plate includes a square notch in the top edge to receive and support the front end of said right side arm therein when said left and right side arms and coupler are locked and stored on said L-shaped beam.]

[8. An apparatus as recited in claim 1, wherein:

said elongated tube includes a stop cap threaded on the left end adapted to enclosed the end of said tube and, further included is a narrow ring mounted on said tube for holding said left end collar in rotatable position.]

[9. An apparatus as recited in claim 1, wherein:

said elongated tube also includes a hole extending therethrough adjacent to the outside face of said right end plate and inserted with a bolt threaded with a nut to prevent said right end collar from sliding off said tube.]

*10. A tow bar apparatus for use in interconnecting a front end of a first vehicle to be towed with a second vehicle for towing the first vehicle, comprising:*

*means including a coupler and a pair of elongated first and second arms interconnected with the coupler to form a tow bar which has relatively extended and collapsed positions when in and out of use, respectively, and*

*means for mounting the tow bar on a frame of the first vehicle adjacent the front end thereof so that the tow bar can be extended and collapsed in relation to the front end to assume the respective extended and collapsed positions thereof when the tow bar is in and out of use, respectively,*

*the coupler having means thereon with which to couple the tow bar to the second vehicle when the tow bar is in use,*

*the pair of elongated first and second arms each having relatively rearward and forward end portions which are telescopically engaged with one another so that each of the respective first and second arms is extensible and controllable relatively lengthwise thereof,*

*the tow bar mounting means including an elongated support member having spaced ends and a longitudinal axis extending from one of the spaced ends thereof to the other of the spaced ends thereof,*

*means for mounting the elongated support member on the front of the first vehicle so that the support member extends generally transverse the first vehicle adjacent the front end thereof and the longitudinal axis of the support member is disposed in a horizontal line,*

*a pair of mounting elements for mounting the tow bar on the support member,*

*a first of said pair of mounting elements being engaged on the support member adjacent the one of the spaced ends thereof so as to be fixed against movement along the longitudinal axis of the support member, and a second of said pair of mounting elements being slidably engaged on the support member between the first mounting element and the other of the spaced ends of the support member so as to be movable along the longitudinal axis of the support member between spaced first and second positions thereon relatively proximate to the first mounting element and relatively remote from the first mounting element, respectively,*

*the relatively rearward end portions of the first and second arms being pivotally connected with the first and second mounting elements, respectively, so that the respective first and second arms are pivotable about the first and second mounting elements, respectively, in a plane of the support member substantially coinciding with the longitudinal axis thereof,*

*the relatively forward end portion of the first arm being pivotally connected with the coupler at a first connection therebetween having a pivot therein whose axis of rotation is relatively transverse the plane of the support member, and the relatively forward end portion of the second arm being rigidly connected with the coupled at a second connection therebetween which is spaced apart from the pivot in the first connection so that when the tow bar is in the collapsed position thereof, and the respective first and second arms are extended relatively lengthwise thereof, pivoted in relation to one another at the pivot in the first connection, and pivoted about the first and second mounting elements, respectively, in the plane of the support member, the second mounting element will move along the longitudinal axis of the support member from the first position to the second position thereof on the support member to enable the coupler and the respective arms to move relatively away from the support member so that the tow bar can assume the extended position thereof relative of the front end of the first vehicle when the tow bar is in use, and when the respective first and second arms are thereafter contracted relatively lengthwise thereof, pivoted in relation to one another at the pivot in the first connection, and pivoted about the first and second mounting elements, respectively, in the plane of the support member, the second mounting element will move along the longitudinal axis of the support member from the second position to the first position thereof on the support member to enable the coupler and the respective arms to move relatively toward the support member so that the tow bar can resume the collapsed position thereof relative to the front end of the first vehicle when the tow bar is out of use,*

*stop means for limiting the movement of the second mounting element along the axis of the support member to the respective first and second positions thereof on the support member,*

*first releasable detention means for releasably detaining the tow bar in the extended position thereof relative to the front end of the vehicle when the tow bar is in use, and*

*second releasable detention means for releasably detaining the tow bar in the collapsed position thereof relative to the front end of the first vehicle when the tow bar is out of use.*

*11. The tow bar apparatus according to claim 10 wherein the support member is cylindrical and the respective first and second mounting elements are engaged thereon to rotate about the longitudinal axis of the support member so that the tow bar can be extended in relation to the front end of the first vehicle in a generally horizontal plane substantially coinciding with the longitudinal axis of the support member when the tow bar is in use, and then rotated into a generally vertical plane substantially coinciding with the longitudinal axis of the support member when the tow bar is out of use.*

*12. The tow bar apparatus according to claim 10 wherein the tow bar mounting means also include a pair of generally spaced parallel first and second plates which are connected with the respective one and other of the spaced ends of the support member, respectively, transverse the longitudinal axis thereof, the first mounting element is engaged on the support member adjacent the first plate, a collar is fixedly mounted on the support member between the first mounting element and the second plate, the second mounting element is slidably engaged on the support member between the collar and the second plate, and the stop means are formed on the collar and the second plate to limit the movement of the second mounting element along the axis of the support member to first and second positions thereon adjacent the collar and the second plate, respectively.*

*13. The tow bar apparatus according to claim 12 further comprising an elongated beam rigidly interposed between the first and second plates in spaced parallel relationship to the support member, and wherein the support member is cylindrical and the respective first and second mounting elements are rotatably engaged thereon so that the tow bar and the respective first and second mounting elements can be rotated about the longitudinal axis of the support member to an orientation in which the tow bar is extended in relation to the front end of the first vehicle in a generally horizontal plane substantially coinciding with the longitudinal axis of the support member when the tow bar is in use, and then the tow bar and the respective first and second mounting elements can be rotated from the generally horizontal plane into a generally vertical plane substantially coinciding with the longitudinal axis of the support member when the tow bar is out of use, and the first releasable detention means include lugs on the second mounting element and the beam which are oppositely disposed to one another along parallels to the longitudinal axis of the support member and engageable with one another to prevent the second mounting element from moving toward the first position thereof from the second position thereof on the support member when the tow bar is rotated from the generally vertical plane into the*

*generally horizontal plane substantially coinciding with the longitudinal axis of the support member, and disengageable from one another to release the second mounting element for movement toward the first position thereof from the second position thereof on the support member when the tow bar is rotated from the generally horizontal plane into the generally vertical plane substantially coinciding with the longitudinal axis of the support member.*

*14. The tow bar apparatus according to claim 13 wherein the first releasable detention means also include pin and hole means for releasably attaching the relatively rearward and forward end portions of the respective first and second arms to one another when the tow bar is in the extended position thereof.*

*15. The tow bar apparatus according to claim 14 further comprising means in the respective first and second arms for positioning the respective pin and hole means in alignment with one another when the tow bar is in the extended position thereof.*

*16. The tow bar apparatus according to claim 13 wherein the second releasable detention means include means for releasably attaching the coupler to the second plate when the tow bar is out of use in a generally vertical plane substantially coinciding with the longitudinal axis of the support member.*

*17. The tow bar apparatus according to claim 10 wherein the coupler has relatively forward and rearward ends in said plane of the support member, and is Y-shaped between the relatively forward and rearward ends thereof so as to have a neck portion adjacent the relatively forward end thereof and a relatively flared portion adjacent the relatively rearward end thereof, and wherein the respective first and second connections between the coupler and the relatively forward end portions of the first and second arms are formed on the relatively flared portion of the coupler.*

*18. The tow bar apparatus according to claim 10 wherein when the tow bar resumes the collapsed position thereof, the first arm is adapted to be contractible relatively lengthwise thereof to a lesser length in one stage of contraction, and the second arm is adapted to be contractible relatively lengthwise thereof to a length shorter than the lesser length of the first arm in two successive stages of contraction.*

* * * * *

UNITED STATES PATENT AND TRADEMARK OFFICE

CERTIFICATE OF CORRECTION

PATENT NO. : RE 38,751 E
DATED : July 5, 2005
INVENTOR(S) : Darrel Buell Davis

It is certified that error appears in the above-identified patent and that said Letters Patent is hereby corrected as shown below:

Column 7,
Line 8, delete “controllable” and replace it with -- contractible --.
Line 13, delete “front” and replace it with -- frame --.
Line 45, delete “coupled” and replace it with -- coupler --.

Signed and Sealed this

Thirteenth Day of December, 2005

JON W. DUDAS
*Director of the United States Patent and Trademark Office*